Sept. 5, 1967   B. F. HAAG   3,339,811
BEER KEG

Filed Sept. 7, 1965   3 Sheets-Sheet 2

INVENTOR.
BARON F. HAAG
BY
Walter J. Moracelli
ATTORNEY

Sept. 5, 1967  B. F. HAAG  3,339,811
BEER KEG

Filed Sept. 7, 1965  3 Sheets-Sheet 3

INVENTOR.
BARON F. HAAG
BY
Walter J. Monacelli
ATTORNEY 3,339,811
BEER KEG
Baron F. Haag, Wickliffe, Ohio (% Brau Supply Co., Inc., 2169 St. Clair Ave., Cleveland, Ohio 44114)
Filed Sept. 7, 1965, Ser. No. 485,304
2 Claims. (Cl. 222—394)

This invention relates to a new beer keg. More specifically it relates to a beer keg designed to facilitate and simplify the application of compressed gas to the interior of the keg and the withdrawal of beer therefrom. Still more particularly, it relates to a beer keg having as an integral part hereof attachments adapted to quick and easy insertion of connectors for the compressed gas feed line and the beer outflow line.

There are numerous patents covering various designs of tapping valves for beer kegs. These indicate the complexity and difficulties encountered in the removal of beer from beer kegs and accompanying problems such as complete recovery of beer from the keg and washing and draining the wash solutions from the keg and from the tapping valve before the keg is refilled. Typical patents of this type are the Lamoureux Patent 2,545,620, Sariotti et al. Patent 3,115,150, Tonna et al. 3,115,149, and numerous others.

The complexity of these valves are apparent from even a cursory examination. There are various portholes and rotatable parts in the valves which require careful design for their manufacture and operation. Moreover, tapping valves presently in commercial use still present problems in complete drainage from the keg and valve, both in dispensing beer and also in complete removal of the washing and rinsing solutions from the various openings in the tapping valves.

In addition to the complexity of this type of commercial valve, there are other problems. The key used by the beer retailers for opening and closing the valve eventually becomes worn with the result that the valve is not completely closed when the key is turned to the closed position. This means that insects and various other types of contamination can enter the empty barrel in transit back to the brewery and also presents difficulties at the brewery during the washing and refilling operations. Furthermore, the necessity for manual insertion of a key to open the barrel for the cleaning and refilling operations means a considerable expense in labor costs for such operations.

In another type of beer keg used commercially, the keg is tapped through a plastic cork by forcing or jamming a hollow tube which is about 3/4 inches in diameter and of sufficient length to reach from the top of the barrel to the lowermost drainage part of the bottom of the barrel. Since the jamming of the tube is against the pressure within the barrel, there are very often accidents in which the tube is shot backward, sometimes injuring the operator or damaging the tube. In any case there is considerable effort and inconvenience required in inserting this tube through the plastic cork into the keg. Moreover, these tubes must be stored and must be retained in good condition to perform their function properly. Very often the tubes become bent and battered out of shape, and must be replaced. Furthermore, when the tube is removed from the keg, there is an opening left in the plastic cork, through which bugs and even mice have been known to crawl into the keg, thereby complicating the washing and sterilizing of the keg.

As described hereinafter, the keg of the present invention provides:
(1) A simple means of tapping compared to the use of the present commercial kegs;
(2) self-sealing upon removal of the connectors for the compressed gas and beer dispensing lines;
(3) A permanent tapping tube which is retained inside of the keg, thereby not subject to bending or battering as in the type described above, and moreover
(4) A keg that can be automatically washed since it is capable of automatic positioning and application of washing and rinsing equipment.

By the beer keg of this invention and the couplings which this beer keg is adapted to be connected with simply and quickly, the use of complex tapping valves or tapping tubes and the accompanying difficulties are avoided. The compressed air line and the beer dispensing line are quickly and simply attached for immediate use, and are quickly and simply detached when the barrel has been emptied. Moreover, in view of the simplicity of parts and the freedom from various portholes or openings in the tapping valves, the problem of complete removal of cleaning and rinsing solutions are avoided.

In the beer keg of this invention, there is a recessed portion of the barrel in which adaptors are incorporated as an integral part of the keg which are designed to receive quick and easy connections with the compressed gas feed line and the beer dispensing line respectively.

The beer keg of this invention is best described by reference to the drawings.

Figure 1:
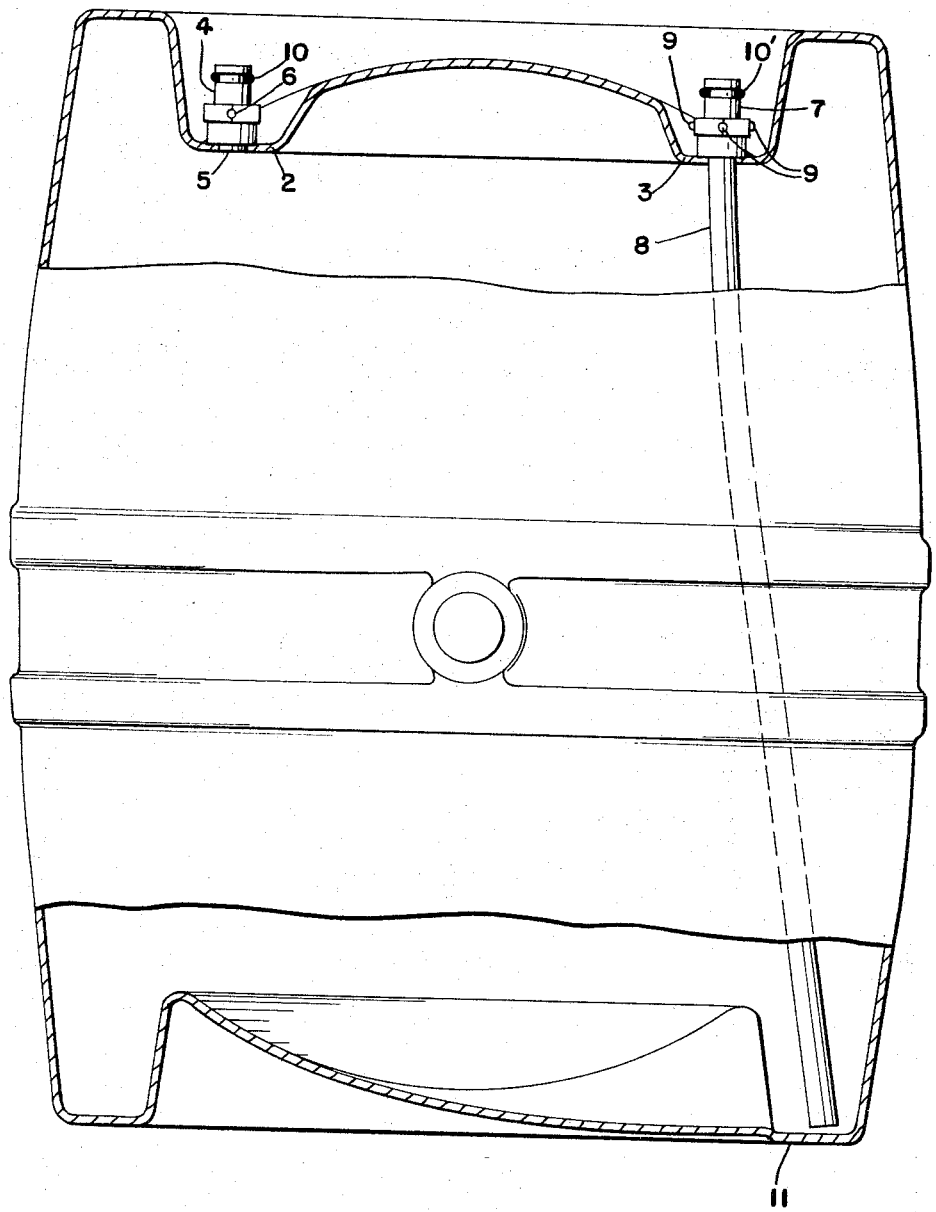
FIG. 1 is a view in elevation, partially broken away, of a keg of this invention.

The adaptors which are described herein as incorporated as integral parts of the kegs, have a spring-actuated closure means, such that when a connector attached to the end of the compressed gas or beer outlet line is disconnected from such adaptor, the adaptor is in a closed position, whereby no fluid can pass through the adaptor. When the aforementioned connector or coupling is inserted into position and attached to the adaptor, a pin or other device in the connector presses against the spring-actuated closure means to immediately effect an opening through which gas may flow into the barrel or beer flow out of the barrel according to whichever line is being connected.

To avoid attaching the beer outflow line to the adaptor provided for gas inflow, the coupling on the beer outflow line has the number and arrangement of slots adapted to accommodate a corresponding number of pins on the outside of the beer flow adaptor and thereby lock the coupling into tight, beer-flowing position. The number of slots on this connector and the corresponding number of pins on the adaptor for the beer flow line preferably differ from the number of corresponding slots and pins on the gas inflow line. This difference in arrangement of slots and pins prevents any possibility of connecting the beer line to the gas inflow adaptor, and vice versa connecting the gas line to the beer outflow adaptor.

In the arrangement shown in the drawings, the beer outflow adaptor has three pins arranged equally distant from each other in a horizontal plane around the outer surface of the adaptor over which the beer line coupling is fitted, with slots provided vertically and angularly to accommodate the pins and thereby lock the coupling into tight position with the adaptor. With regard to the gas line coupling and the corresponding adaptor, there are two pins on the outer surface of the adaptor, and two slots correspondingly arranged so that the gas line coupling is tightly locked into position on the gas inflow adaptor.

Once the couplings are locked into position on the adaptors, the coupling-adaptor assemblies are in open position for fluid flow. Consequently it is generally desirable to have the beer outflow line connected first, with the dispensing valve at the end of the beer flow line in a closed position, before the gas flow coupling is attached to the gas flow adaptor. Alternatively the gas pressure can be turned off while the gas line coupling is being attached to the corresponding adaptor and then the gas pressure turned on after the adaptor has been connected and the beer outflow line has been attached.

In the drawings, keg 1 is similar in most respects in outer configuration to the type of kegs presently in commercial use. FIG. 1 shows a keg having two recessed portions 2 and 3. However, the keg of this invention has in recessed portion 2, gas inflow adaptor 4 integrally attached in such a manner that the compressed gas flows into the interior of the keg through opening 5. Pin 6 is one of the two pins previously described for locking the gas flow connector or coupling (shown in FIGS. 3 and 5) into position with the gas flow adaptor. In recessed portion 3, beer flow adaptor 7 is likewise integrally attached to the keg with tube 8 in flow communication with the opening in this adaptor and extending downwardly into the interior of the keg to the extreme lowermost bottom 11 of the keg. Pins 9 of this adaptor are the three pins described above for locking into position the connector for the beer outflow line (neither the connector nor beer outflow line is shown in this view, but they are shown in FIG. 3).

O-rings 10 and 10' are provided in the upper region of the adaptors 4 and 7 for effecting a tight seal against the interior of the respective connectors.

Figure 2:
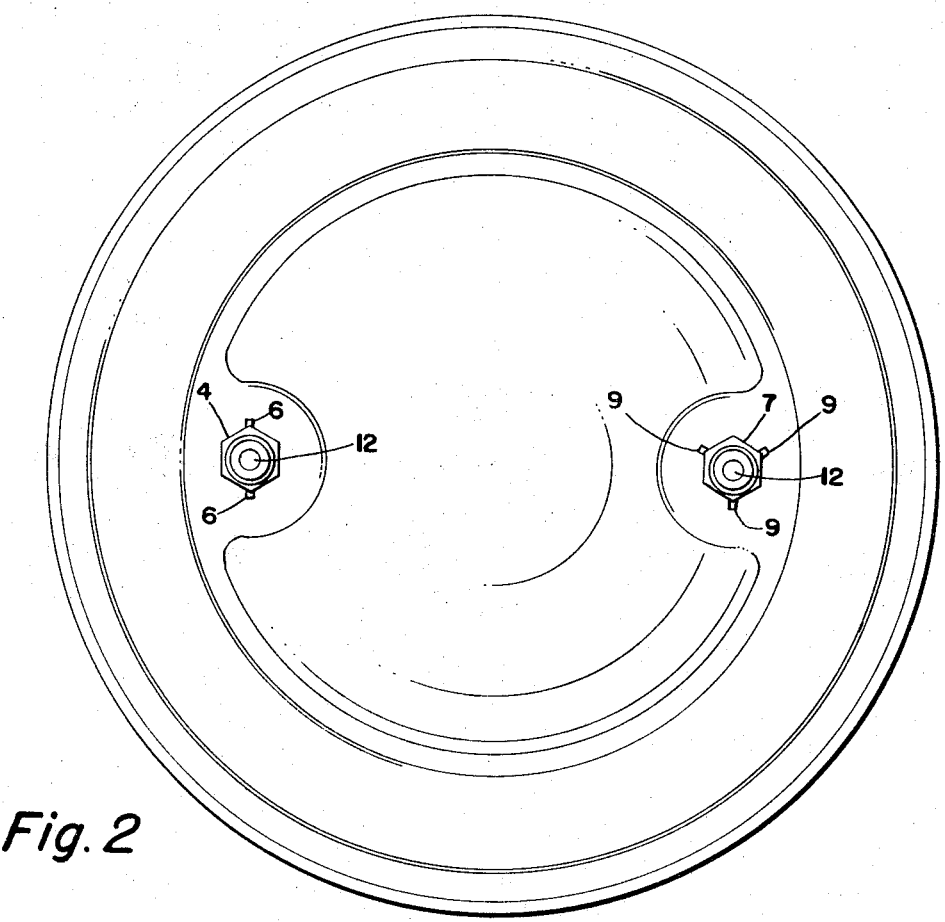
FIG. 2 is a top view of the keg shown in FIG. 1.

FIG. 2 is a top view of the keg modification shown in FIG. 1. In this figure, closure means or piston 12 is shown in the top view as held in closed position by a spring (not shown) positioned in the interior of the adaptor and below the piston. When the connector is positioned over the adaptor, a pin in the interior of the connector pushes this piston 12 downwardly out of closed position and thereby provides open communication for fluid flow through the connector and the adaptor. FIG. 2 shows the arrangements of two pins 6 in the gas adaptor 4 and three pins 9 in the beer flow adaptor 7, as discussed above.

Figure 3:
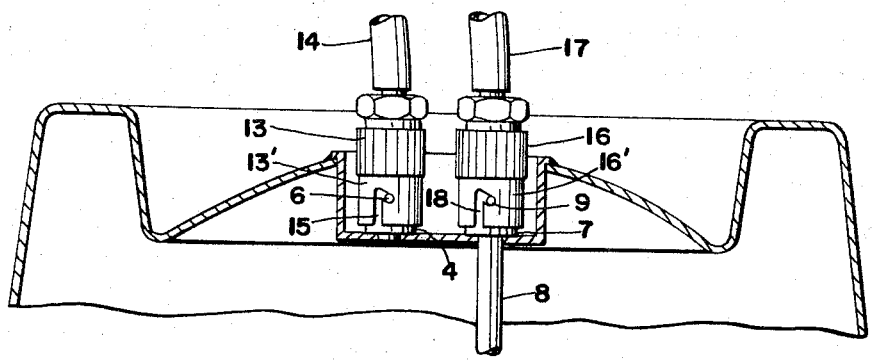
FIG. 3 is a cross-sectional side view of the top of a keg showing another modification of this invention.

In the modification shown in FIG. 3, the connectors are shown locked into position over the adaptors. Gas connector 13 is shown attached to gas line 14 and then locked into position by pin 6 around which the connector is fitted by means of slot 15 and turned into the locked position shown. The beer line connector 16 is shown attached to beer line 17 and locked into position onto beer flow adaptor 7 by means of pin 9. The connector 16 is positioned around pin 9 by virtue of slot 18 in cylindrical sleeve 16' of connector 16.

Figures 4, 5:
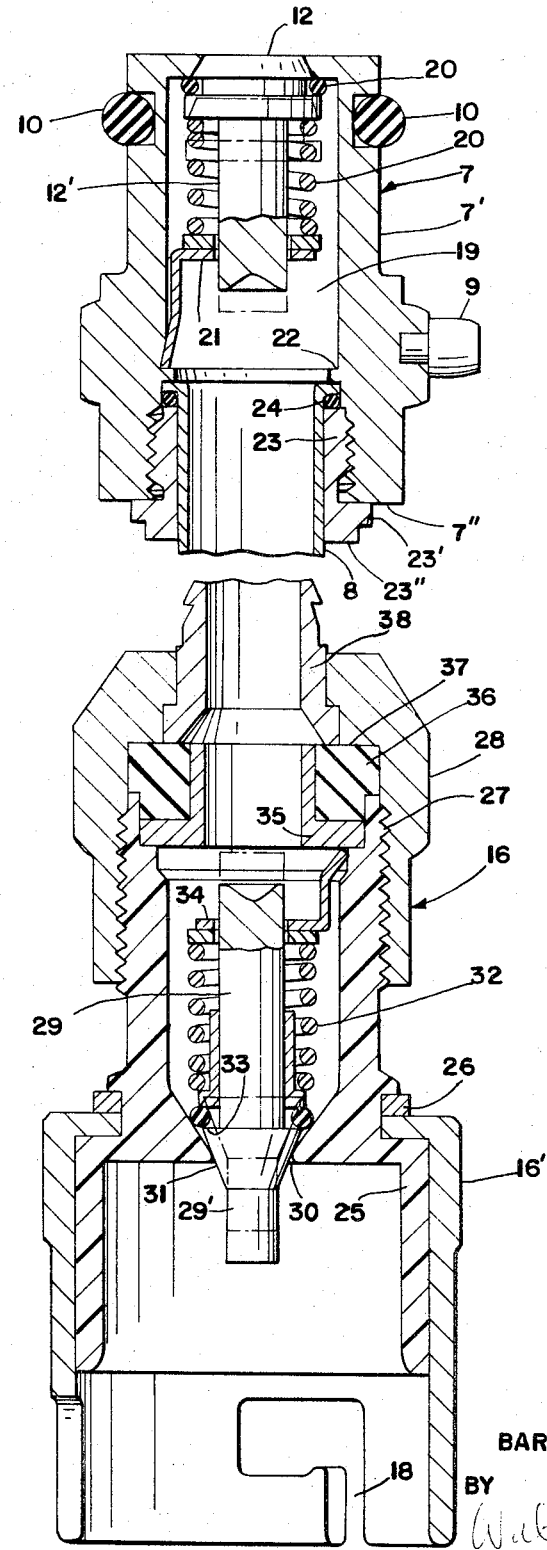
FIG. 4 is a vertical cross-sectional view of an adaptor suitable for use for this invention.
FIG. 5 is a vertical cross-sectional view of a connector or coupling suitable for connection to the adaptor of FIG. 4.

FIG. 4 illustrates an adaptor suitable for permanent attachment to the keg as described herein. Main body portion 7' has an opening 19 extending linearly through the adaptor with the opening having a tapered section at one end against which piston 12 is held in contact by coil spring 20. This spring is held in position by support means 21 which encircles the lower portion 12" of piston 12.

Lip 22 extends inwardly from the interior surface of opening 19 so as to hold supporting means 21 in position and likewise to serve as an abutting edge against the end of tube 8 extending into the interior of the adaptor. The end of tube 8 is held in tight contact against lip 22 by means of threaded sleeve 23 which fits into the threaded portion in the interior of opening 19 at the end thereof opposite from the end at which piston 12 is positioned. O-ring 24 provides a tight seal between the end of tube 8 and the interior wall of main body portion 7'.

The lower edge 7" of the adaptor can be welded to the top surface of the recessed portion 3 as shown in FIG. 1. In such case, the opening into the interior of the keg is large enough to accommodate the portion 23' of cylindrical sleeve 23. Alternatively, the adaptor can be affixed to the keg by welding of the surface 23" of cylindrical sleeve 23, in which case the opening into the interior of the keg need be only large enough to accommodate the extension of the tube 8 into the keg.

The details of the adaptor shown in FIG. 4 are described according to the adaptor as used in connecting the beer outflow line to the keg. However, the same adaptor can be used as the gas-inflow adaptor by having tube 8 only long enough to extend into the immediate interior of the keg. Actually, in such case, the adaptor need not have a tube 8 fitted into the interior of the adaptor, but can have the size of the opening into the keg correspond in size to opening 19 and have opening 19 communicate directly with the opening in the keg. In such case, the lower surface 7" of the adaptor is welded to the keg. Moreover, the number and position of pins and slots in the adaptor and coupling respectively can be changed as discussed above.

The assembled connector or coupling shown in FIG. 5 consists of outer sleeve portion 16' which has slot 18 adapted to fit around pin 9 of the adaptor of FIG. 4. In a portion of the interior of sleeve 16, plastic liner 25 is fitted and held in tight relationship by means of washer 26. This plastic liner extends through one end of sleeve 16' and at the opposite end has a threaded exterior portion 27. Plastic liner 25 has an opening of varying diameter and shape extending through the length of the liner.

Over the threaded portion 27 is threadably fitted a second cylindrical sleeve 28. Sleeve 28 also has an opening extending therethrough of varying diameter. In the interior of plastic liner 25, there is positioned a pin 29 having its end portion 29' extending through a restricted portion 30 of the opening extending through the plastic liner 25 and into the interior of sleeve 16'. Tapered portion 31 of pin 29 is of a size and shape to fit tightly into sealing relationship with the restricted opening 30.

Coil spring 32 encircles pin 29. One end of coil spring 32 bears against lip 33 extending around the exterior of pin 29 and the other end of the coil spring presses against supporting means 34, which is held in position by collar 35 and plastic ring 36, which are in the interior of sleeve 28 and held in position by a restriction 37 in the opening in the interior of sleeve 28. Also fitted into the interior of sleeve 28 is tube 38 tightly fitted and locked into position in the interior of sleeve 28 and in fluid-tight relationship therewith. A portion of this tube 28 extends through and out from the opening in sleeve portion 28, and has circular grooves on the exterior thereof adapted to receive and hold in fluid-tight relationship therewith the beer outflow or gas-inflow line.

When the coupling or connector of FIG. 5 is positioned and locked onto the adaptor of FIG. 4, the extension 29' of pin 29 presses against the top surface of piston 12 in such a manner that both piston 12 and pin 29 are displaced from the positions shown in FIGS. 4 and 5 respectively and thereby provide communication between the openings in the adaptor and coupling respectively. In this manner, once the adaptor and coupling are locked to each other, the interior of the keg is in flow communication with the line or tube connected to the coupling of FIG. 5.

While the modifications shown in FIGS. 4 and 5 are preferred in the practice of this invention, various other modifications are obvious and intended to be included within the scope of this invention.

Moreover, while the location and positioning of the adaptor in the exterior configuration of the keg are preferred as shown in the drawings, various other positions are suitable and intended to be included within the scope of this invention. For example, it is possible to have the gas inflow adaptor at the top of the keg, and the beer-outflow adaptor in a lower region, or even at the bottom of the keg with a shorter tube reaching to the lowermost region. It is likewise possible to have the beer outflow adaptor positioned in a false bottom or extension of the keg with the top of piston 12 forming part of and coinciding with the lowermost surface at the bottom of the keg, and thereby not requiring any tube extending into the keg.

Furthermore, since it is desirable to have the capacity of the keg standard in all cases, it is obvious that in order to accommodate the recessed portion to receive the adaptor, as described herein, the outer configuration of the keg is modified accordingly to compensate for the space in the interior of the keg taken by such recessed portion and thereby provide the standard liquid capacity of the keg.

While the recessed portion of the keg is preferably stamped in during the manufacture of the keg, it is possible to convert kegs not having such recessed portions by cutting a hole in the appropriate position and welding a cup of appropriate size to provide the recess. This is illustrated in FIG. 3.

Openings or holes of appropriate size are drilled into the bottom of the recessed portions and the adaptors affixed in position over these openings. The adaptor is integrally affixed to the keg preferably by welding, but can also be screwed or otherwise permanently or semi-permanently attached to the keg.

In addition to the ease and speed with which the compressed gas and beer dispensing lines are connected to the keg of this invention, another advantage of this invention is the fact that there is no leakage or seepage from the keg or from the connecting lines when the couplings are disconnected from the adaptors. Instantaneously upon disconnection of the coupling the spring actuated pistons snap into closed position to prevent any flow through the adaptor and through the coupling.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A beer keg comprising:
   (a) a body formed of sheet metal having at least one recessed portion in the outer configuration of said body;
   (b) a compressed gas adaptor integrally attached to said body in a said recessed portion said adaptor having a locking means adapted to have quickly and simply locked into flow communicating relationship therewith a connecting means for a supply of compressed air;
   (c) a beer-outflow adaptor integrally attached to said body in a said recessed portion said adaptor having a locking means adapted to be simply and quickly locked into flow communicating relationship with a connecting means for a beer dispensing tube, said beer outflow adaptor being in direct flow communication with the lowermost portion of the bottom of said keg;
   each said recessed portion in said outer configuration of said body being recessed sufficiently so that each of said adaptors when integrally attached to said body in said recessed portion does not extend beyond the length of said beer keg;
   both said compressed gas adaptor and said beer-outflow adaptor having spring-actuated means for preventing flow of fluid through said adaptor when not attached to a said connecting means and adapted when locked in position with said connecting means to have said spring-actuated closing means displaced from the closed position to an open position whereby flow communication is provided between the interior of said keg and said connecting means.

2. A beer-dispensing system comprising:
   (1) a keg comprising:
      (a) a body formed of sheet metal having at least one recessed portion in the outer configuration of said body;
      (b) a compressed gas adaptor integrally attached to said body in a said recessed portion said adaptor having a locking means adapted to have quickly and simply locked into flow communicating relationship therewith a connecting means for a supply of compressed air;
      (c) a beer-outflow adaptor integrally attached to said body in a said recessed portion said adaptor having a locking means adapted to be simply and quickly locked into communicating relationship with a connecting means for a beer dispensing tube, said beer outflow adaptor being in direct flow communication with the lowermost portion of the bottom of said keg;
      each said recessed portion in said outer configuration of said body being recessed sufficiently so that each of said adaptors when integrally attached to said body in said recessed portion does not extend beyond the length of said beer keg;
      both said compressed gas adaptor and said beer-outflow adaptor having spring-actuated means for preventing flow of fluid through said adaptor when not attached to a said connecting means and adapted when locked in position with said connecting means to have said spring-actuated closing means displaced from the closed position to an open position whereby flow communication is provided between the interior of said keg and said connecting means;
   (2) a gas-inflow coupling means attached to a source of compressed gas, said coupling means having a means therein adapted to displace from a closed position the spring-actuated means of said gas inflow adaptor and thereby when locked in position on said adaptor to provide flow communication between the interior of said keg and the source of compressed air; and
   (3) a beer-outflow coupling means having a means therein adapted to displace from its closed position the spring-actuated closing means of said beer-outflow adaptor and thereby provide flow communication between the lowermost region of said keg and through the said beer-outflow coupling means.

References Cited
UNITED STATES PATENTS

| | | | |
|---|---|---|---|
| 447,962 | 3/1891 | Mason | 251—149.8 |
| 1,597,201 | 8/1926 | Jorgensen et al. | 251—149.6 |
| 2,086,000 | 7/1937 | Roren | 222—399 X |
| 2,539,349 | 1/1951 | Giles | 222—464 X |
| 2,638,758 | 5/1953 | Daun | 222—464 X |
| 2,673,010 | 3/1954 | Barrow | 222—464 X |

ROBERT B. REEVES, *Primary Examiner.*

N. L. STACK, *Assistant Examiner.*